United States Patent
Suzuki

(10) Patent No.: US 10,606,537 B2
(45) Date of Patent: Mar. 31, 2020

(54) IMAGE FORMING APPARATUS, CONTROL METHOD, AND STORAGE MEDIUM

(71) Applicant: CANON KABUSHIKI KAISHA, Tokyo (JP)

(72) Inventor: Ryousuke Suzuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/707,745

(22) Filed: Sep. 18, 2017

(65) Prior Publication Data

US 2018/0081610 A1    Mar. 22, 2018

(30) Foreign Application Priority Data

Sep. 21, 2016    (JP) .................................. 2016-183794

(51) Int. Cl.
*G06F 3/12*    (2006.01)

(52) U.S. Cl.
CPC .......... *G06F 3/1267* (2013.01); *G06F 3/1204* (2013.01); *G06F 3/1205* (2013.01); *G06F 3/1238* (2013.01); *G06F 3/1257* (2013.01); *G06F 3/1288* (2013.01)

(58) Field of Classification Search
CPC ............................. G06F 3/1263; G06F 3/1267
See application file for complete search history.

(56) References Cited

U.S. PATENT DOCUMENTS

| | | | | |
|---|---|---|---|---|
| 8,625,138 B2* | 1/2014 | Ida | ........................ | G06F 3/1222 358/1.14 |
| 9,813,589 B2* | 11/2017 | Kakutani | ............ | G06K 15/4095 |
| 2001/0012122 A1* | 8/2001 | Ueda | ..................... | G06F 3/1222 358/1.15 |
| 2003/0093670 A1* | 5/2003 | Matsubayashi | ....... | G06F 3/1212 713/168 |
| 2004/0213615 A1* | 10/2004 | Nakao | .................... | G06F 21/608 400/76 |
| 2006/0239736 A1* | 10/2006 | Kitada | .................. | G06F 3/1204 400/62 |
| 2007/0182988 A1* | 8/2007 | Maeda | .................. | G06F 3/1208 358/1.15 |
| 2009/0080022 A1* | 3/2009 | Tsutsumi | .............. | G06F 3/1204 358/1.15 |
| 2009/0231619 A1* | 9/2009 | Takahashi | ............. | G06F 21/608 358/1.15 |
| 2009/0290190 A1* | 11/2009 | Torii | ..................... | G06F 3/1222 358/1.15 |

(Continued)

FOREIGN PATENT DOCUMENTS

| | | | |
|---|---|---|---|
| JP | 8-286851 A | | 11/1996 |
| JP | 08286851 A | * | 11/1996 |

(Continued)

*Primary Examiner* — Ted W Barnes

(74) *Attorney, Agent, or Firm* — Canon U.S.A., Inc., IP Division

(57) ABSTRACT

An image forming apparatus used in an image forming system including an operation panel, a printer engine, and a hard disk drive (HDD) for storing print data for forming an image according to a print instruction, out of print data received from an external apparatus, stores a particular reservation print job in the HDD, and upon receiving a print job of the same user as that of the particular reservation job, reserves the print job.

10 Claims, 14 Drawing Sheets

(VERIFICATION EXAMPLE 1) CASE WHERE ORDER OF JOBS OF THE SAME USER IS GUARANTEED, AND USER 01 DOES NOT LOG IN UNTIL JOB 04 IS RECEIVED

(56) References Cited

U.S. PATENT DOCUMENTS

| | | | | |
|---|---|---|---|---|
| 2010/0182624 A1* | 7/2010 | Murakami | G06F 3/1204 | 358/1.9 |
| 2011/0164275 A1* | 7/2011 | Mikura | G06F 3/1203 | 358/1.15 |
| 2011/0197271 A1* | 8/2011 | Buck | G06F 3/1204 | 726/9 |
| 2011/0235096 A1* | 9/2011 | Iwasawa | G06F 3/1222 | 358/1.15 |
| 2012/0250068 A1* | 10/2012 | Yamamoto | G06F 21/608 | 358/1.14 |
| 2013/0016388 A1* | 1/2013 | Amano | G06F 3/1204 | 358/1.14 |
| 2013/0163031 A1* | 6/2013 | Tanaka | G06F 3/1203 | 358/1.14 |
| 2013/0208300 A1* | 8/2013 | Sakura | G06K 15/4045 | 358/1.14 |
| 2014/0146361 A1* | 5/2014 | Nakane | G06F 3/1207 | 358/1.15 |
| 2014/0233053 A1* | 8/2014 | Kakutani | G06F 3/1222 | 358/1.14 |
| 2014/0313544 A1* | 10/2014 | Hasegawa | G06F 3/1288 | 358/1.15 |
| 2014/0320899 A1* | 10/2014 | Willett | G06F 3/1224 | 358/1.15 |
| 2015/0002882 A1* | 1/2015 | Nakajima | G06F 3/1218 | 358/1.14 |
| 2015/0055162 A1* | 2/2015 | Nakajima | G06F 21/608 | 358/1.13 |
| 2015/0138590 A1* | 5/2015 | Fukahori | G06F 3/1213 | 358/1.14 |
| 2015/0256532 A1* | 9/2015 | Funayama | H04L 63/102 | 726/4 |
| 2015/0269464 A1* | 9/2015 | Atsumi | G06K 15/4095 | 358/1.16 |
| 2015/0277823 A1* | 10/2015 | Nakayama | G03G 15/5087 | 358/1.14 |
| 2016/0054957 A1* | 2/2016 | Sako | G06F 3/1205 | 358/1.15 |
| 2016/0188260 A1* | 6/2016 | Saino | G06F 3/1222 | 358/1.15 |
| 2017/0149985 A1* | 5/2017 | Nomura | G06F 3/1204 | |
| 2017/0280004 A1* | 9/2017 | Inoue | G06F 3/1222 | |
| 2017/0308341 A1* | 10/2017 | Ormond | G06F 3/1267 | |

FOREIGN PATENT DOCUMENTS

| | | | | |
|---|---|---|---|---|
| JP | 11146115 A | * | 5/1999 | |
| JP | 2002323965 A | * | 11/2002 | |
| JP | 2002323965 A | * | 11/2002 | |
| JP | 2002373073 A | * | 12/2002 | |
| JP | 2014107695 A | * | 6/2014 | G06F 3/1207 |
| JP | 2015-104867 A | | 6/2015 | |
| JP | 2015-107594 A | | 6/2015 | |
| JP | 2015104867 A | * | 6/2015 | G06F 3/1267 |
| JP | 2015107594 A | * | 6/2015 | H04N 1/0048 |
| JP | 2015-155174 A | | 8/2015 | |
| JP | 2015155174 A | * | 8/2015 | |
| JP | 2018024258 A | * | 2/2018 | |

* cited by examiner

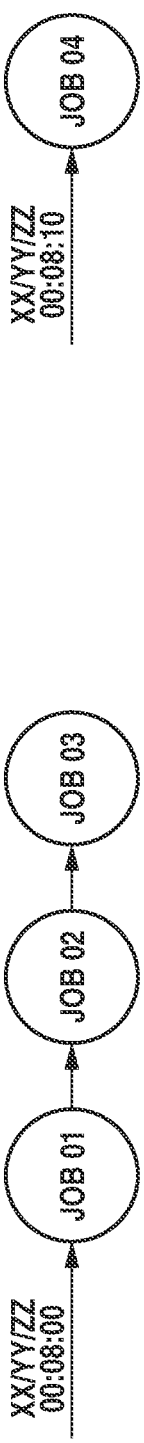

FIG.8A

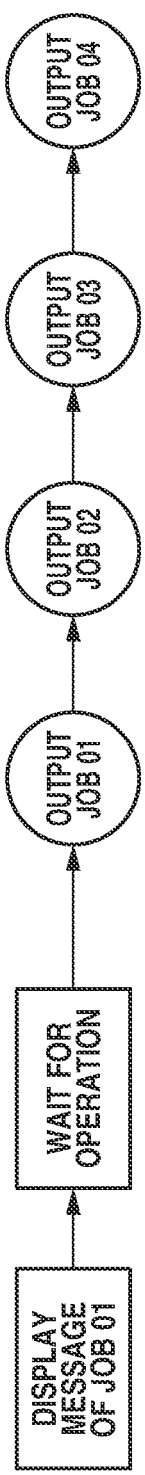

FIG.8B (CONVENTIONAL EXAMPLE) CASE WHERE JOB OF ANOTHER USER IS ALSO RESERVED

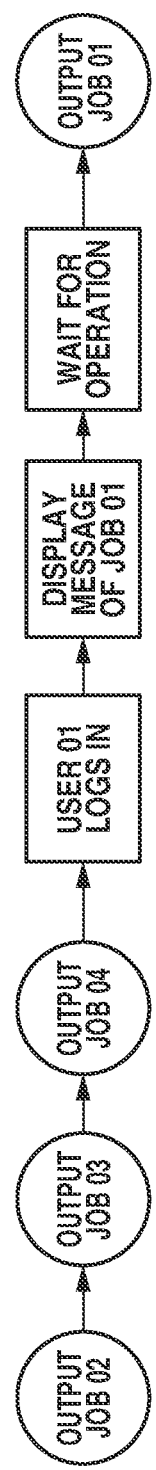

FIG.8C (COMPARATIVE EXAMPLE) CASE WHERE ONLY JOB WITH MESSAGE IS RESERVED

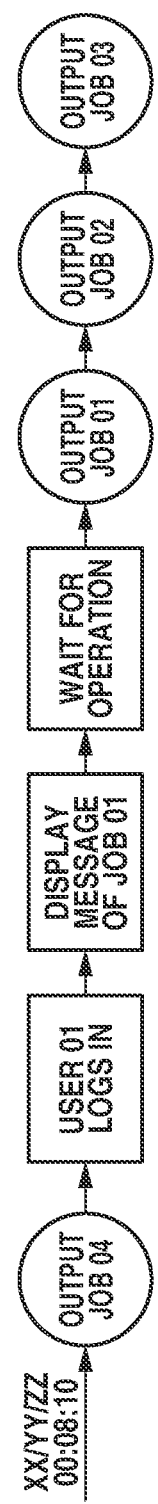

FIG.8D (VERIFICATION EXAMPLE 1) CASE WHERE ORDER OF JOBS OF THE SAME USER IS GUARANTEED, AND USER 01 DOES NOT LOG IN UNTIL JOB 04 IS RECEIVED

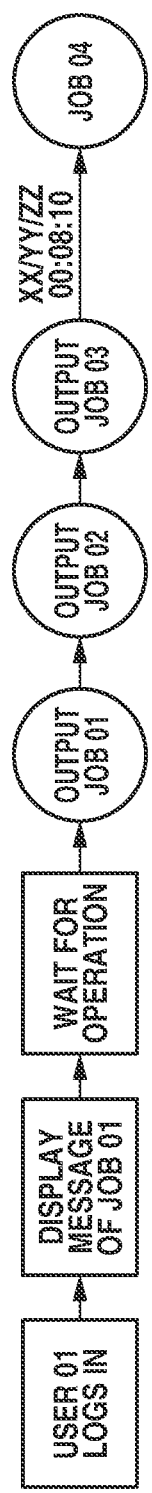

FIG.8E (VERIFICATION EXAMPLE 2) CASE WHERE ORDER OF JOBS OF THE SAME USER IS GUARANTEED, AND USER 01 LOGS IN BEFORE JOB 04 IS RECEIVED

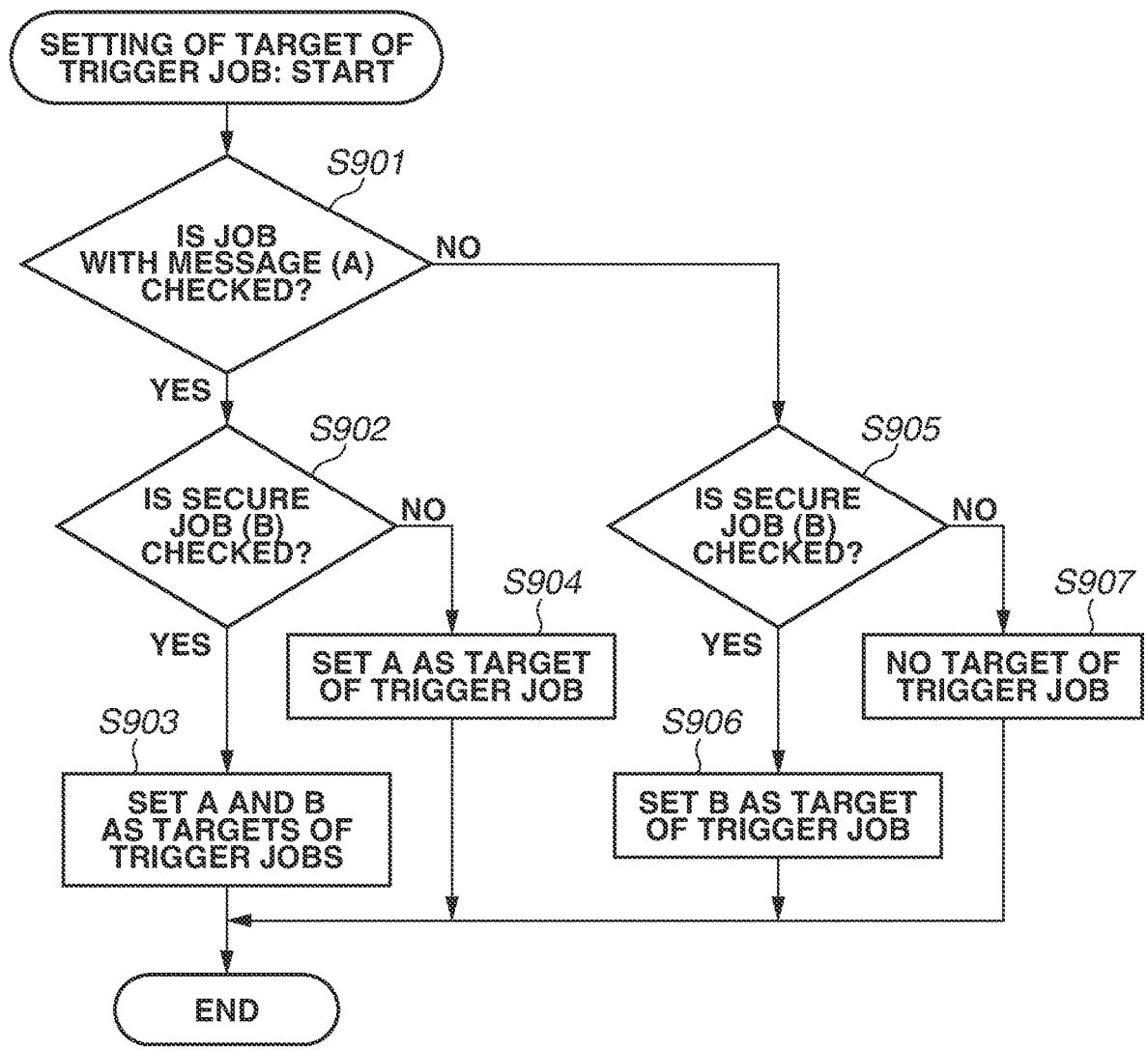

FIG.10A

|  | PRINT |  |  |
|---|---|---|---|
| XXX.XXX.XXX.100 ▽ |  |  | LOGOUT |

| | FILE NAME ▽ | DATE ▽ | MESSAGE |
|---|---|---|---|
| ☐ | FILE 11<br>COLOR, TWO-SIDED | XX/YY/ZZ<br>08:00:00 | PRINT WITH THICK PAPER |
| ☐ | FILE 12<br>MONOCHROME | XX/YY/ZZ<br>08:01:00 | NO MESSAGE |
| ☐ | FILE 13<br>COLOR, 2 IN 1 | XX/YY/ZZ<br>08:05:00 | NO MESSAGE |

| SELECT ALL | PREVIEW |  | DELETE |
|---|---|---|---|
|  | CHANGE PRINT SETTINGS |  | PRINT |

FIG.10B

|  | PRINT |  |  |
|---|---|---|---|
| XXX.XXX.XXX.100 ▽ |  |  | LOGOUT |

| | DOCUMENT NAME ▽ | DATE ▽ | MESSAGE |
|---|---|---|---|
| 1 | FILE 11<br>COLOR, TWO-SIDED | XX/YY/ZZ<br>08:00:00 | PRINT WITH THICK PAPER |
| 2 | FILE 12<br>MONOCHROME | XX/YY/ZZ<br>08:01:00 | NO MESSAGE |
| 3 | FILE 13<br>COLOR, 2 IN 1 | XX/YY/ZZ<br>08:05:00 | NO MESSAGE |

| SELECT ALL | PREVIEW |  | DELETE |
|---|---|---|---|
|  | CHANGE PRINT SETTINGS |  | PRINT |

FIG.10C

|  | PRINT |  |  |
|---|---|---|---|
| XXX.XXX.XXX.110 ▽ |  |  | LOGOUT |

| | DOCUMENT NAME ▽ | DATE ▽ | MESSAGE |
|---|---|---|---|
| ☐ | FILE 14<br>COLOR | XX/YY/ZZ<br>08:03:00 | NO MESSAGE |
| ☐ |  |  |  |
| ☐ |  |  |  |

| SELECT ALL | PREVIEW |  | DELETE |
|---|---|---|---|
|  | CHANGE PRINT SETTINGS |  | PRINT |

FIG.11A

| | DOCUMENT NAME ▽ | DATE ▽ | TRANSMISSION SOURCE ▽ | MESSAGE |
|---|---|---|---|---|
| ☐ | FILE 11 | XX/YY/ZZ 08:00:00 | XXX.XXX.XXX.100 | PRINT WITH THICK PAPER |
| ☐ | FILE 12 | XX/YY/ZZ 08:00:10 | XXX.XXX.XXX.100 | NO MESSAGE |
| ☐ | FILE 13 | XX/YY/ZZ 08:00:20 | XXX.XXX.XXX.100 | NO MESSAGE |
| ☐ | FILE 14 | XX/YY/ZZ 08:00:20 | XXX.XXX.XXX.110 | NO MESSAGE |

PRINT — LOGOUT — 1100

SELECT ALL | PREVIEW | DELETE
CHANGE PRINT SETTINGS | PRINT

FIG.11B

PRINT — LOGOUT — 1101

DO YOU ALSO SELECT FILE 01 AND FOLLOWING JOBS?
FILE 12, FILE 14

SELECT | SELECT ONLY FILE 01

SELECT ALL | PREVIEW | DELETE
CHANGE PRINT SETTINGS | PRINT

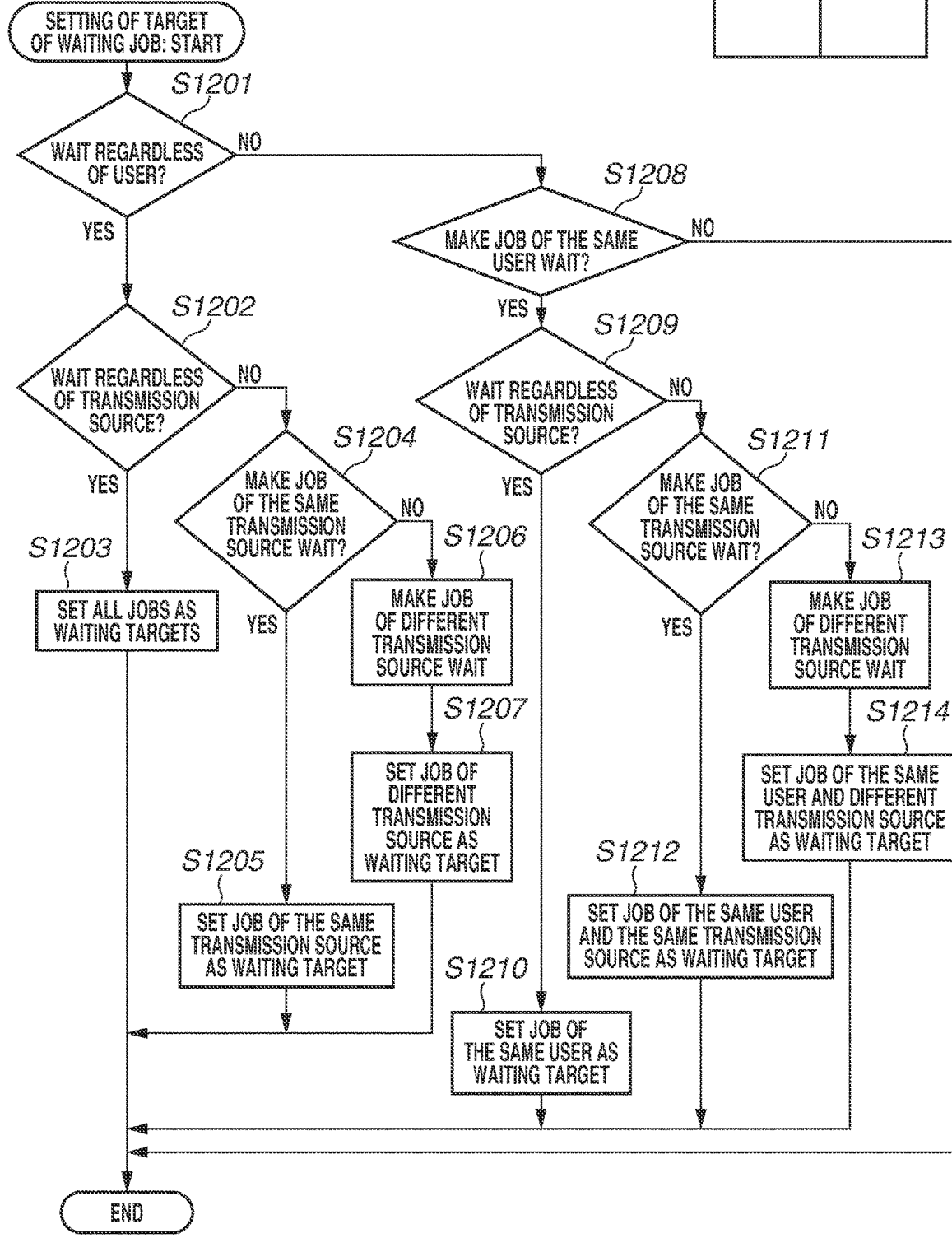

IMAGE FORMING APPARATUS, CONTROL METHOD, AND STORAGE MEDIUM

BACKGROUND

Field

The present disclosure relates to an image forming system, including an image processing apparatus, for forming an image on a sheet. The image processing apparatus includes copying, printing, and/or faxing functions.

Description of the Related Art

Conventionally, an image forming system for forming an image based on print data is known. In the image forming system, an image forming apparatus such as a printer is used. In the image forming apparatus, an image processing apparatus for processing a print job is provided.

The image forming apparatus receives a print job and performs a printing process based on the received print job. A method for starting the printing process can be classified into two methods, a method for automatically starting printing based on receipt of the print job (normal printing) and a method for storing the received print job and starting printing based on an instruction received, typically from a user, by the image forming apparatus (reservation printing). Normal printing is used for a print job for which a password is not set and an operation of the user is not necessary. Reservation printing is used for a print job for which a password is set and an operation of the user is necessary. The image forming apparatus confirms whether a password is set for the received print job, and can thereby determine whether to perform normal printing or reservation printing.

In a case where a user wishes to reserve a plurality of print jobs, it is troublesome to set each of the print jobs for reservation. Japanese Patent Application Laid-Open No. 8-286851 discusses an image forming apparatus for, in a case where a single print job is reserved, automatically reserving a print job to be subjected to subsequent normal printing.

In the image forming apparatus of Japanese Patent Application Laid-Open No. 8-286851, due to a print job of a user who wishes to reserve the print job, even a print job of another user who does not wish to reserve the print job is reserved. If a print job is reserved even if a user does not wish to reserve the print job, the waiting time of the user increases, which is inconvenient. For this reason, there is a demand for an image forming apparatus that reserves a print job of a user who wishes to reserve the print job, while avoiding reserving a print job of another user.

SUMMARY

The present disclosure is directed to an image processing apparatus that reserves a print job of a particular user subsequent to particular print job, while not reserving a print job of a user different from the particular user subsequent to the particular print job.

According to an aspect of the present disclosure, an image forming apparatus including an image forming unit configured to form an image on a sheet and a storage unit configured to store print data and including a memory storing a program and one or more controllers that when executing the program are configured to perform receiving and storing print data satisfying a pre-defined condition, and receiving and storing print data that does not satisfy the pre-defined condition and is associated with same user information as user information associated with the print data satisfying the pre-defined condition, based on the print data satisfying the particular condition being stored in the memory.

Further features will become apparent from the following description of exemplary embodiments with reference to the attached drawings.

BRIEF DESCRIPTION OF THE DRAWINGS

FIG. 8A is a diagram illustrating submission timings of print jobs. FIG. 8B is a diagram illustrating a conventional example. FIG. 8C is a diagram illustrating a comparative example. FIG. 8D is a diagram illustrating an operation in the present exemplary embodiment. FIG. 8E is a diagram illustrating another operation in the present exemplary embodiment.

FIG. 9 is a determination flow of a setting of a target of a trigger job.

FIG. 10A is a diagram illustrating a first step of an instruction screen. FIG. 10B is a diagram illustrating a second step of the instruction screen. FIG. 10C is a diagram illustrating a third step of the instruction screen.

FIG. 11A is a diagram illustrating a first step of an instruction screen. FIG. 11B is a diagram illustrating a second step of the instruction screen.

FIGS. 12A and 12B are a determination flow of a setting of a waiting target job.

DESCRIPTION OF THE EMBODIMENTS

An exemplary embodiment will be described below. The present disclosure, however, is not limited to the configuration of the exemplary embodiment. Part or all of the configuration can be replaced with equivalents in the range where similar effects are obtained.

[Image Forming System]

Figure 1:
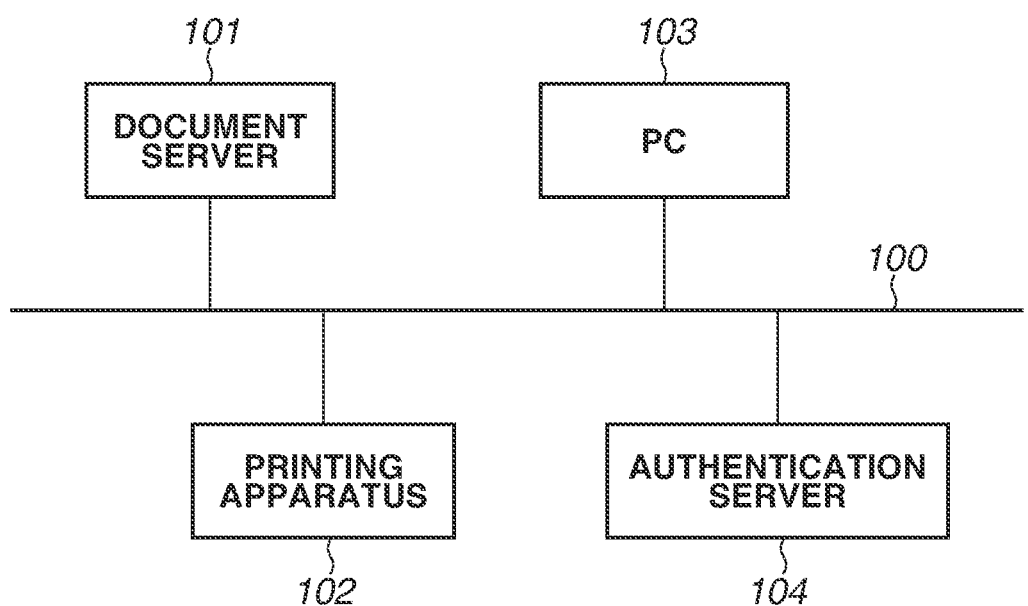
FIG. 1 is a block diagram illustrating an overall configuration of a system.

The exemplary embodiment to be used in the description is carried out by an image forming system (a printing system) as illustrated in FIG. 1. FIG. 1 is a diagram illustrating the configuration of the image forming system. As illustrated in FIG. 1, the image forming system includes a document server 101, a printing apparatus 102, a personal computer (PC) 103, and an authentication server 104. These apparatuses are connected by a network 100 and can exchange various pieces of information with each other via the network 100.

The document server 101 is a storage device (a storage unit, an external apparatus of the printing apparatus 102) that stores a print job (print data). A user identification (ID) is assigned to a print job stored in the document server 101.

The printing apparatus 102 is an image forming apparatus for forming an image on a sheet (paper, a recording material).

The PC 103 is an operation terminal operated by a user. The PC 103 transmits instructions provided by the user to the document server 101 and the printing apparatus 102.

The authentication server 104 is a management apparatus for managing user information about a user using the image forming system. In an authentication unit 208, authentication information about a user with authority to operate the printing apparatus 102 is registered in advance. Then, the authentication server 104 checks authentication information transmitted from the printing apparatus 102 against the authentication information registered in advance. The authentication server 104 then returns the result of the check to the printing apparatus 102. The authentication information is information obtained by, for example, combining a user ID as an identifier for identifying a user with a password corresponding to the user ID. A user ID can be embedded into a header portion of print data and can associate the print job with a user.

In the present exemplary embodiment, an image is formed by the image forming system via the following procedure. First, the PC 103 creates a print job based on document data. Next, the PC 103 directly transmits the created print job to the printing apparatus 102 or transmits the print job to the document server 101. If the print job is transmitted to the document server 101, the document server 101 stores and manages the received print job. Then, according to an instruction from the PC 103, the document server 101 transmits the print job to the printing apparatus 102. Based on the print job received from the PC 103 or the document server 101, the printing apparatus 102 forms an image.

[Printing Apparatus]

Figure 2:
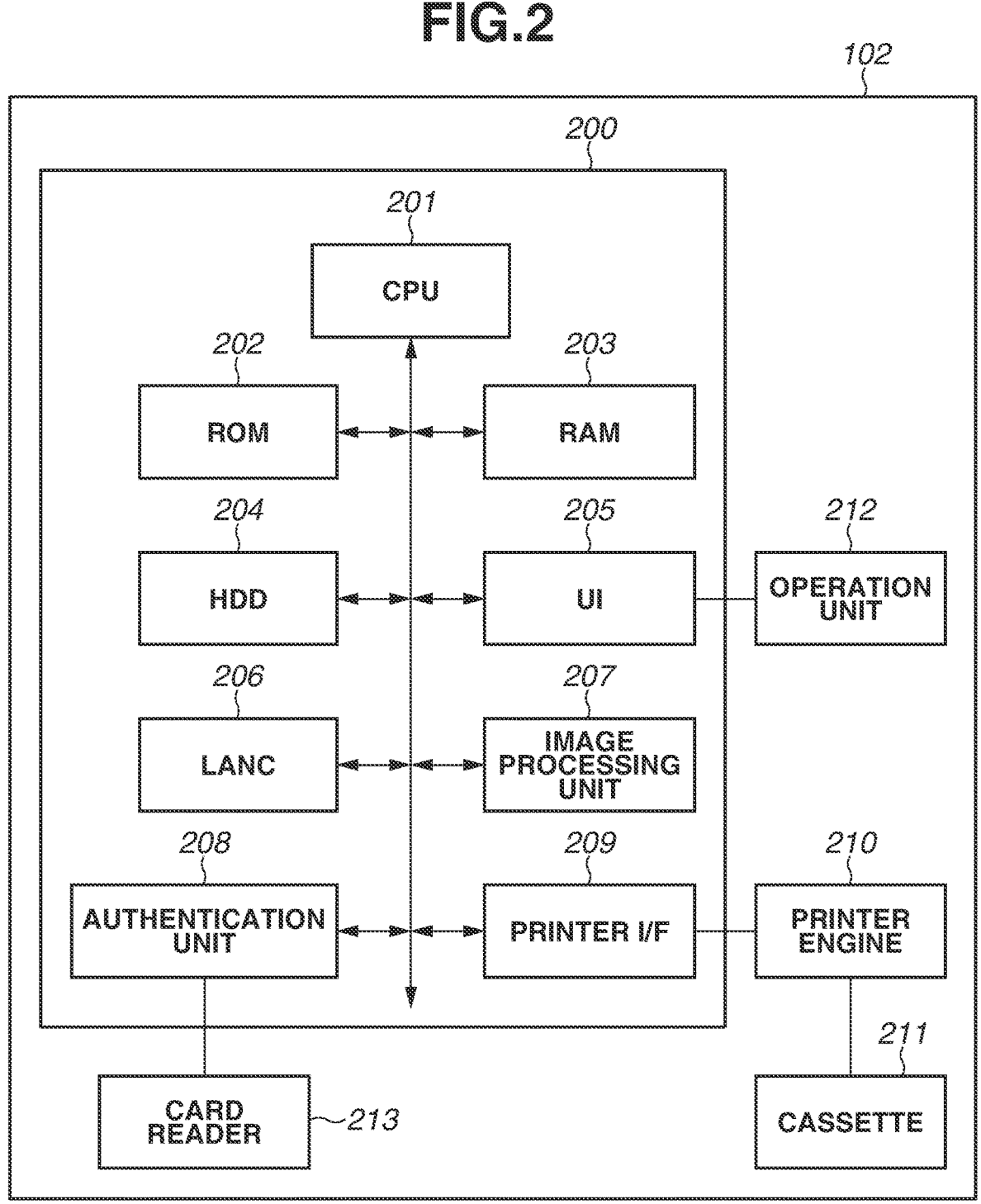
FIG. 2 is a block diagram illustrating a hardware configuration of a printing apparatus.

Next, the configuration of the printing apparatus 102 is described in detail. FIG. 2 is a block diagram illustrating the hardware configuration of the printing apparatus 102. As illustrated in FIG. 2, the printing apparatus 102 includes a controller 200, a printer engine 210, a cassette 211, an operation unit 212, and a card reader 213.

The printer engine 210 is an image forming unit for forming an image on a recording material (paper, a sheet). Based on the receipt of a print job or a print instruction from a user, the image forming unit forms an image. The printer engine 210 can use an electrophotographic method or an ink-jet method to form the image.

The cassette 211 is a stacking unit for stacking recording materials, and is also a supply unit for supplying a recording material to the printer engine 210. The cassette 211 supplies a recording material to the printer engine 210 in synchronization with an image forming operation of the printer engine 210.

The operation unit 212 is a reception unit for receiving an instruction from a user. The operation unit 212 includes a plurality of physical buttons and a touch panel. The touch panel functions as a display unit for displaying information to the user, i.e., a notification unit that notifies the user of information. The user can provide an instruction to the operation unit 212 by selecting an object displayed on the touch panel.

The card reader 213 is a reading unit for reading user authentication information from the user's integrated circuit (IC) card. Alternatively, another component for acquiring authentication information can be used as long as the component can acquire information enabling authentication of the user. For example, a sensor for reading biological information such as a fingerprint or a vein pattern, or a keyboard that enables the user to input an ID identifying the user.

The controller 200 is a control unit for performing overall control of the components of the printing apparatus 102. As illustrated in FIG. 2, the controller 200 includes a central processing unit (CPU) 201, a read-only memory (ROM) 202, a hard disk drive (HDD) 204, a local area network controller (LANC) 206, an authentication unit 208, a random-access memory (RAM) 203, a user interface (UI) 205, an image processing unit 207, and a printer interface (I/F) 209. The components of the controller 200 can exchange a signal with each other using a bus.

The CPU 201 is a processing unit for performing processing based on a program. The CPU 201 loads various programs stored in the ROM 202 or the HDD 204 into the RAM 203 and controls the printing apparatus 102.

The RAM 203 is a storage unit for temporarily storing data. The RAM 203 is used as, for example, a main memory and a work area for the CPU 201.

The ROM 202 is a non-volatile storage unit that saves data. In the ROM 202, for example, various programs and management data of the printing apparatus 102 are stored.

The HDD 204 is a non-volatile storage unit that saves large-capacity data. In the HDD 204, various programs including an application program and an operating system are stored. The HDD 204 also functions as a storage unit for storing a received print job.

The UI 205 is a user interface for performing communication and control regarding the operation unit 212. Based on instructions from various programs, the UI 205 displays a character and an image on the touch panel of the operation unit 212. The UI 205 receives a signal transmitted from the operation unit 212 based on an instruction from the user and communicates with the CPU 201 based on the received signal.

The LANC 206 is a network interface controller. The LANC 206 is connected to the network 100. This enables the printing apparatus 102 to communicate data with the document server 101 and the PC 103 via the LANC 206.

The image processing unit 207 is a conversion unit for interpreting a print job (page description language (PDL) data) and converting the print job into a bitmap (image data).

The authentication unit 208 is an authentication unit for authenticating the user as a registered user. The authentication unit 208 transmits, to the authentication server 104, authentication information acquired from the user and acquires the result of a check from the authentication server 104. Then, based on confirmation that the authentication information matches according to the result of the check, the authentication unit authenticates the user as a registered user.

The printer I/F 209 is a communication unit for communicating with the printer engine 210. The printer I/F 209 transmits a bitmap and a printing process command to the printer engine 210 and causes the printer engine 210 to execute a printing process (an image forming process). The printer I/F 209 receives a signal from the printer engine 210 and acquires completion information or error information regarding the printing process.

[External Apparatus]

Figure 3:
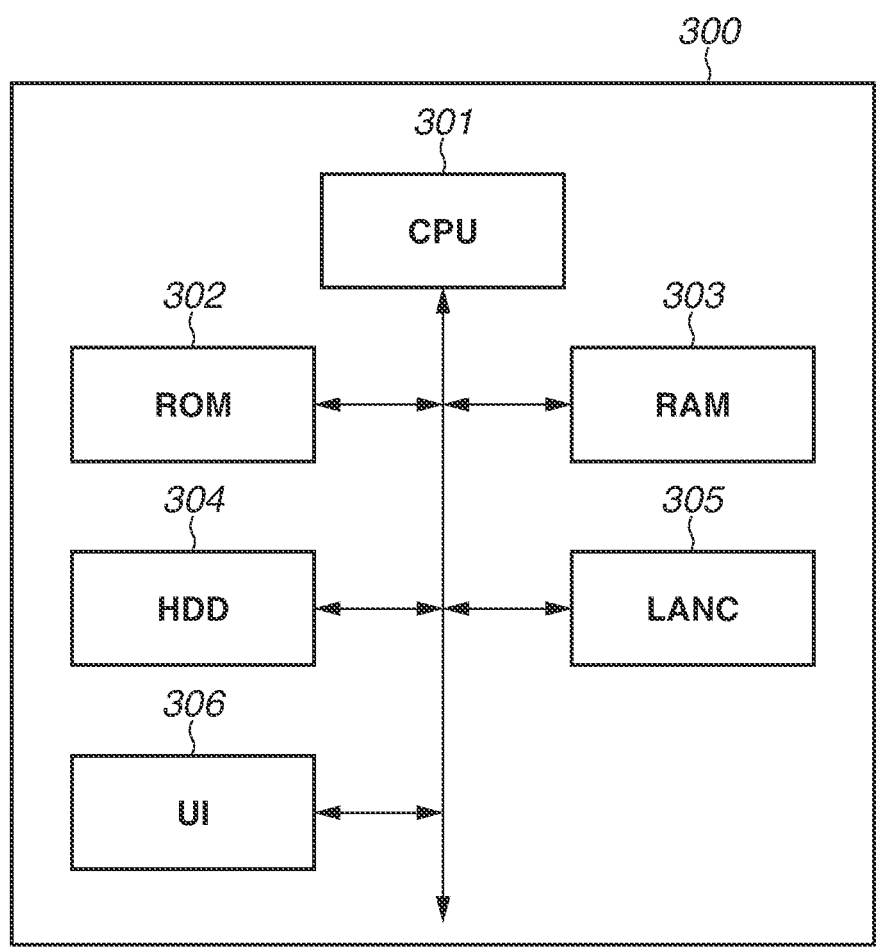
FIG. 3 is a block diagram illustrating a hardware configuration of each of a document server, a personal computer (PC), and an authentication server.

Next, the internal configuration of an external apparatus for communicating with the printing apparatus 102 will be described. For the sake of simplifying the description, the document server 101, the PC 103, and the authentication server 104 are described with reference to the same drawing. FIG. 3 is a block diagram illustrating the hardware configuration of each of the document server 101, the PC 103, and the authentication server 104.

The external apparatus includes a controller 300. The controller 300 includes a CPU 301, a ROM 302, a RAM 303, an HDD 304, a LANC 305, and a user interface 306. The CPU 301 is an information processing unit for reading various programs stored in the ROM 302 or the HDD 304 and controlling the external apparatus. The RAM 303 is a storage unit used as a temporary storage area such as a main memory and a work area for the CPU 301. The ROM 302 is a storage unit for storing various programs and management data of the external apparatus. The HDD 304 is a storage unit for storing various programs including an application program and an operating system, and a print job. The LANC 305 is a wired network interface controller. The user interface 306 is a unit for displaying a character and an image based on instructions from various programs and receiving an operation of a user. The user interface 306 communicates with, for example, a liquid crystal display (LCD) (not illustrated), a keyboard (not illustrated), and a mouse (not illustrated) and controls these devices. The CPU 301 and the user interface 306 are connected to each other by an internal bus so that the CPU 301 and the user interface 306 can communicate with each other.

For convenience, in the following description, the controller 300 of the document server 101 is referred to as the "controller 300A", the controller 300 of the PC 103 is referred to as the "controller 300B", and the controller 300 of the authentication server 104 is referred to as the "controller 300C". The same components in each of the controllers are designated by same numerals for the sake of description.

[Print Job Submission]

Next, a method for submitting a print job is described. The PC 103 according to the present exemplary embodiment can generate a print job from document data and transmit the generated print job to an external apparatus. An application for creating a document and a driver for generating a print job from document data are saved in the HDD 304B. The CPU 301B loads the application and the driver into the RAM 303B and executes the application and the driver.

If document data is created by executing the application, the document data is saved in the HDD 304B. If the driver is executed, document data on which a print job is to be generated can be selected, and the transmission destination of the print job specified. The driver can set a type of print job to be generated (two-sided or one-sided, color or monochrome). The driver according to the present exemplary embodiment can set a message function. The message function is the function causing the operation unit 212 to display a message when the printing apparatus 102 reads the print job.

The message function assigned to the print job is used to issue a warning or an instruction to a user operating the printing apparatus 102 to provide a print instruction. For this reason, the message function is often used in a print job that requires detailed printing conditions. The detailed printing conditions are required, for example, in a case where a type of paper that cannot be specified by a parameter, such as basis weight, is used. If "special paper is used" is set as a message in such a print job, the user can understand that the user should set special paper and provide a print instruction to print this print job. Receiving the print job in which the message function is set, the printing apparatus 102 does not immediately start printing the print job, but starts printing the print job according to a print instruction from the user.

When transmission of the print job is determined after the above settings are made, the driver generates the print job and then starts transmitting the print job.

[Print Job Structure]

Figure 4:
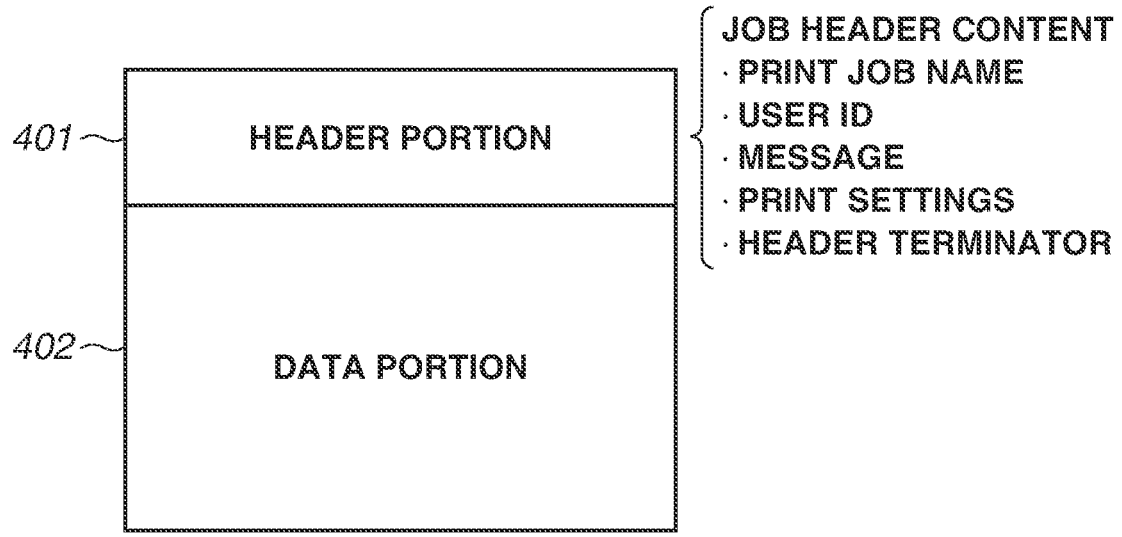
FIG. 4 is a diagram illustrating a data structure of a print job.

Next, the data structure of a print job is described. FIG. 4 is a diagram illustrating the structure of a print job to be saved in the HDD 304A of the document server 101.

A print job used in the present exemplary embodiment includes a header portion 401, which is located at the beginning of data, and a data portion 402. When the print job is received, the printing apparatus 102 detects a terminator at the end of the header portion 401, thereby distinguishing between the header portion 401 and the data portion 402.

Attribute information about the print job is stored in the header portion 401. The attribute information is, for example, a print job name, user ID information about a print job owner, message information, and print setting information. Image data such as a bitmap and data in the PDL format are stored in the data portion 402. The attribute information is assigned by the driver when the print job is generated. The driver according to the present exemplary embodiment assigns a print job name based on a document data name based on which the print job is generated. The driver assigns, as a user ID, information about a user account that has logged into the PC 103. Based on the settings of a user, the driver assigns a message and print settings.

[Print Application]

Next, the block structure and the processing flow of a print application to be executed by the printing apparatus 102 are described.

Figure 6:
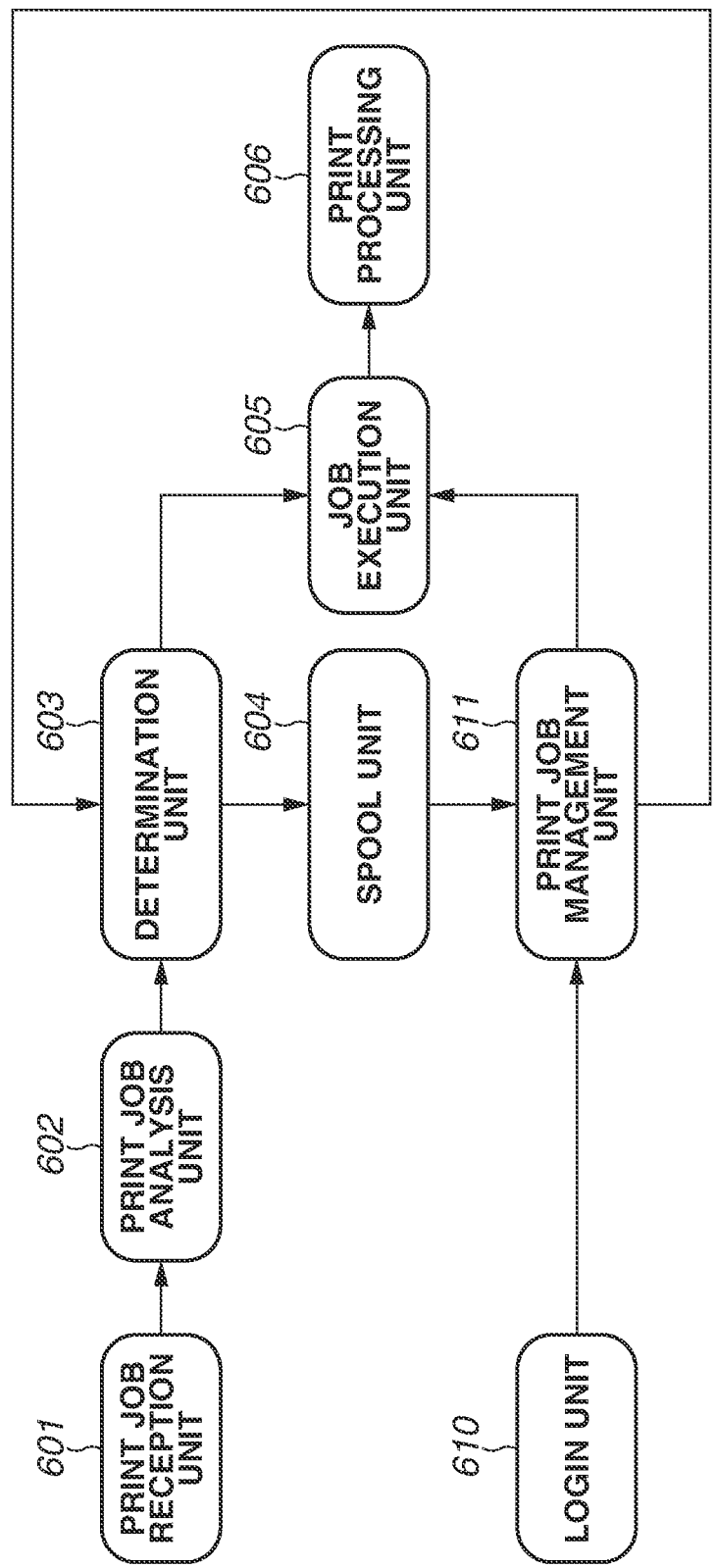
FIG. 6 is a block diagram illustrating a software configuration of the printing apparatus.

FIG. 6 is a diagram illustrating the block configuration of the print application. The print application is saved in the HDD 204, loaded into the RAM 203 by the CPU 201, and executed by the CPU 201. As illustrated in FIG. 6, the print application includes a print job reception unit 601, a print job analysis unit 602, a determination unit 603, a spool unit 604, a job execution unit 605, a print processing unit 606, a login unit 610, and a print job management unit 611.

The print job reception unit 601 is a processing unit for performing a reception process for receiving a print job. When a print job is transmitted from the document server 101, the print job reception unit 601 controls the LANC 206 to receive the print job and temporarily saves the print job in the RAM 203 or the HDD 204.

The print job analysis unit 602 is a processing unit for performing an analysis process for analyzing a print job. The print job analysis unit 602 analyzes a print job saved in the RAM 203 or the HDD 204 and temporarily saves, in the RAM 203, an analysis result acquired from the header portion 401.

The determination unit 603 is a processing unit for performing a determination process for determining the execution of printing. The determination unit 603 determines, based on information about an analysis result and setting information about the printing apparatus 102, whether a received print job is to be immediately processed. The information about the analysis result and the setting information about the printing apparatus 102 are saved in the ROM 202 or the RAM 203.

The spool unit 604 is a processing unit for performing a management process for managing a print job. The spool unit 604 saves the analysis result of the analysis unit 602 and a print job in association with each other in the HDD 204. The spool unit 604 assigns an identifier (a job ID) to each saved print job and stores the identifier together with the reception time of the print job so that the order of reception of the print jobs can be determined later.

The job execution unit 605 is a processing unit for performing preprocessing for executing a print job. The job execution unit 605 causes the UI 205 to display a user interface image regarding the execution of a print job. The job execution unit 605 also receives an operation of a user.

The print processing unit 606 is a processing unit for performing a printing process using a print job. The print processing unit 606 causes the image processing unit 207 to generate a bitmap image based on an image data portion of a print job. Then, the print processing unit 606 causes, via the printer I/F 209, the printer engine 210 to form an image based on the generated bitmap image. If an error occurs to the printer engine 210 while the printer engine 210 is forming the image, the print processing unit 606 detects error information via the printer I/F 209.

The login unit 610 is a processing unit for performing an authentication process for authenticating a user. The login unit 610 causes, via the UI 205, the operation unit 212 to display a user interface screen regarding authentication. The login unit 610 controls the LANC 206 to transmit authentication information acquired by the authentication unit 208 to the server 104.

The print job management unit 611 is a processing unit for performing a management process for managing a reserved print job. The reserved print job is a print job that is not to be immediately printed based on a determination made by the determination unit 603.

The print job management unit 611 can manage a plurality of print jobs having the same user ID as print jobs of the same user.

[Print Job Reservation Setting]

The printing apparatus 102 according to the present exemplary embodiment can make a print job reservation setting. A print job reservation function is a function of not immediately starting to print the print job when the print job is received from an external apparatus, such as the PC 103 or the document server 101, but after an instruction is received from a user. The printing apparatus 102 includes a plurality of different operation modes in the range of a reservation target. The user can set one of the plurality of operation modes. Examples of the plurality of operation modes include an all-job forced reservation mode, a job-induced reservation mode, and a job-specific reservation mode.

The all-job forced reservation mode is a mode of reserving all the print jobs, regardless of the types of received print jobs. The job-induced reservation mode is a mode of reserving a print job in a case where the print job received after receipt of a particular print job is related to a particular print job. The job-specific reservation mode is a mode of reserving an acquired print job based on the print job type of the acquired print job. The print job to be reserved is, for example, a secure print job.

Figure 13:
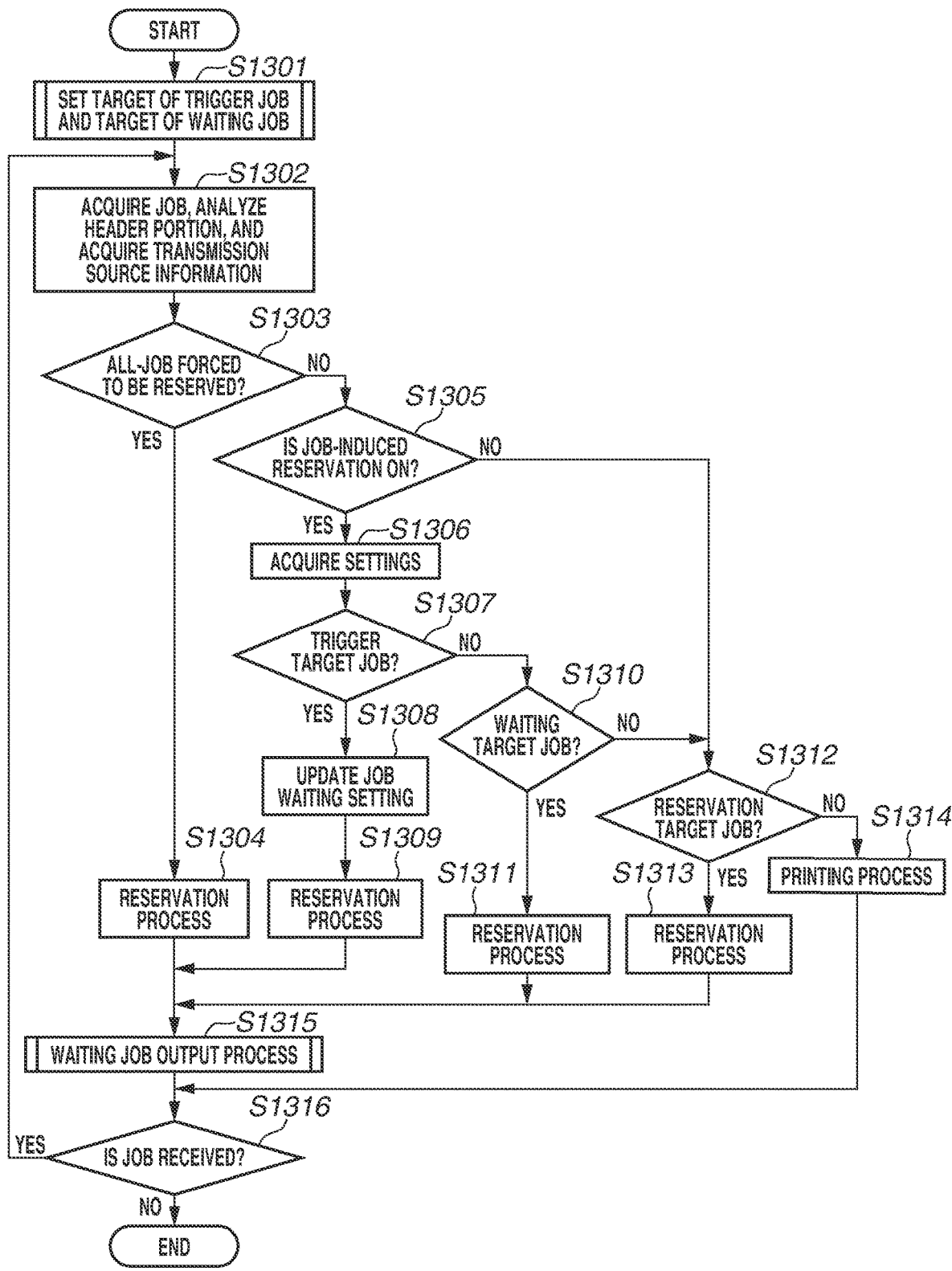
FIG. 13 is a flowchart of a control method for controlling the printing apparatus.

The setting of the mode is used in the print application executed by the printing apparatus 102. FIG. 13 is a flowchart of the operation of the print application.

When the print application starts, the CPU 201 receives settings from the user in step S1301. The details of the settings will be described below. When the settings are made, then in step S1302, the CPU 201 waits to receive a print job. Upon receiving a print job, the CPU 201 analyzes the header portion 401 and acquires transmission source information. Then, in step S1303, the CPU 201 confirms the reservation setting. If the reservation setting is an all-job forced reservation setting (YES in step S1303), the CPU 201 performs a reservation process for reserving the print job. The all-job forced reservation setting is a setting for uniformly reserving the print jobs regardless of the content or the types of the print jobs. If the reservation setting is a job-induced reservation setting (No in step S1303, YES in step S1305), then in step S1306, the CPU 201 acquires setting information about a target of a trigger print job and setting information about a target of a waiting print job. Then, in step S1307, using the acquired setting information, the CPU 201 determines whether the print job is a trigger target print job. If the print job is a trigger target print job (YES in step S1307), then in step S1308, the CPU 201 makes a setting so that a waiting target print job is caused to wait based on the trigger print job. Then, in step S1309, the CPU 201 performs a reservation process for reserving the print job. If the print job is not a trigger target print job (NO in step S1307), then in step S1310, the CPU 201 determines whether the print job is a waiting target print job. If the print job is a waiting target print job (YES in step S1310), then in step S1311, the CPU 201 performs a reservation process for reserving the print job. If the print job is not a waiting target print job (NO in step S1310), or if the reservation setting is not the job-induced reservation setting (NO in step S1305), then in step S1312, the CPU 201 determines whether the print job is a reservation target print job. A "reservation target print job" refers to a print job to be reserved regardless of the job-induced reservation setting, such as a print job with a message or a secure print job. If the print job is a reservation target print job (YES in step S1312), then in step S1313, the CPU 201 performs a reservation process for reserving the print job. If the print job is not a reservation target print job (NO in step S1312), then in step S1314, the CPU 201 performs a printing process for printing the print job.

In step S1315, the reserved print job is processed in a waiting print job output process. The details of the waiting print job output process will be described below.

In step S1316, the CPU 201 confirms whether a print job is received. If a print job is received (YES in step S1316), the processing returns to step S1302. If a print job is not received (NO in step S1316), the processing ends.

[Job-Induced Reservation Mode]

The job-induced reservation mode is described in detail. In a case where the job-induced reservation mode is used, first, a trigger print job and a waiting print job are set in advance.

[Trigger Job]

The setting of a target of a trigger print job will now be described. FIG. 9 is a determination flow of the setting of a target of a trigger print job.

In the present exemplary embodiment, the user can set a print job as a target of a trigger print job. A "trigger print job" refers to a print job as a starting point for reserving a subsequent particular print job. In the present exemplary embodiment, a print job that can be set as a trigger print job is classified into two types, a print job with a message (A) and a secure print job (B). Hereinbelow, a print job with a message (A) and a secure print job (B) will be referred to as a "job (A)" and a "job (B)", respectively. The setting is made on a setting screen (not illustrated) displayed on the operation unit 212. A check box for setting a target of a trigger print job is provided for each of the jobs (A) and (B). Each check box can be independently checked, and trigger print jobs can be set in various combinations. Based on the contents of the checks, the CPU 201 determines the contents of the settings as described below.

If the jobs (A) and (B) are checked (YES in step S901, YES in step S902), then in step S903, the CPU 201 sets the jobs (A) and (B) as targets of trigger print jobs.

If the job (A) is checked (YES in step S901, NO in step S902), then in step S904, the CPU 201 sets the job (A) as a target of a trigger print job. If the job (B) is checked (NO in step S901, YES in step S905), then in step S905, the CPU 201 sets the job (B) as a target of a trigger print job. If no job is checked (NO in step S901, NO in step S905), then in step S907, the CPU 201 determines that there is no target of a trigger print job.

[Setting of Waiting Print Job]

Figure 12B:
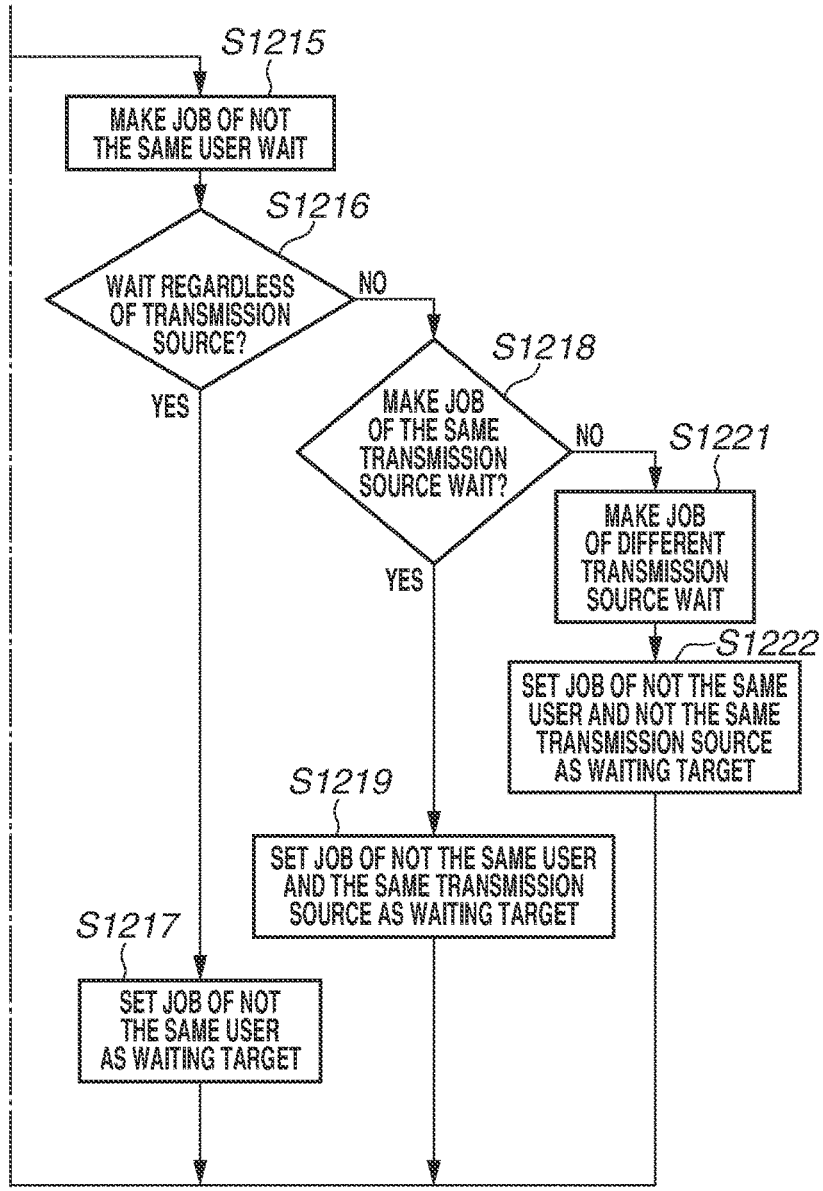

The setting of a target of a waiting print job will now be described. FIGS. 12A and 12B are a determination flow of the setting of a target of a waiting print job.

In the present exemplary embodiment, the user can set a print job as a target of a waiting print job. A "waiting print job" refers to a print job to be reserved, with a trigger print job being used as a starting point. In the present exemplary embodiment, a waiting print job using user information and transmission source information can be set. The setting is made on a setting screen (not illustrated) displayed on the operation unit 212. A setting item of a waiting print job regarding the user information can be selected from three items, "job not based on user information", "job having user information same as that of trigger job", and "job having user information different from that of trigger job". A setting item of a waiting print job regarding the transmission source information can be selected from three items, "job not based on transmission source information", "job of transmission source same as that of trigger job", and "job of transmission source different from that of trigger job". Based on the contents of the checks, the CPU 201 determines the contents of the settings as described below. The effects to be described below can be expected depending on the setting of a waiting print job in FIGS. 12A and 12B.

If "make job wait regardless of user" and "make job wait regardless of transmission source" are checked (YES in step S1201, YES in step S1202), then in step S1203, the CPU 201 sets all print jobs as waiting targets. This setting can be used in a case where, when a trigger print job is transmitted, the user does not wish to start printing a print job other than the trigger print job.

If "make job wait regardless of user" and "make job of the same transmission source wait" are checked (YES in step S1201, YES in step S1204), then in step S1205, the CPU 201 sets a print job of the same transmission source as that of a trigger print job as a waiting target. This setting can be used in a case where the user wishes to guarantee the printing order of print jobs sent from a particular apparatus.

If "make job wait regardless of user" and "make job of different transmission source wait" are checked (YES in step S1201; in step S1206), then in step S1207, the CPU 201 sets a print job of a transmission source different from that of a trigger print job as a waiting target. This setting can be used in a case where, when a trigger print job is transmitted from a particular transmission source, the user does not wish to start printing a print job sent from another transmission source.

If "make job of the same user wait" and "make job wait regardless of transmission source" are checked (YES in step S1208, YES in step S1209), then in step S1210, the CPU 201 sets a print job of the same user as a waiting target. This setting can be used in a case where the user wishes to collectively print the print jobs of the same user as related print jobs.

If "make job of the same user wait" and "make job of the same transmission source wait" are checked (YES in step S1208, YES in step S1211), then in step S1212, the CPU 201 sets a print job of the same user and the same transmission source as a waiting target. This setting can be used in a case where the user wishes to collectively print just those print jobs that are highly relevant to each other from among print jobs of the same user.

If "make job of the same user wait" and "make job of different transmission source wait" are checked (YES in steps S1208; in step S1213), then in step S1214, the CPU 201 sets a print job of the same user and a different transmission source as a waiting target. This setting can be used in a case where, when a particular user transmits a print job from a particular transmission source, the user wishes to reserve the print job, and when the particular user transmits a print job from a different transmission source from the particular transmission source, the user does not wish to reserve the print job.

If "make job of not the same user wait" and "make job wait regardless of transmission source" are checked (in step S1215; YES, in step S1216), then in step S1217, the CPU 201 sets a print job of not the same user as a waiting target. This setting can be used in a case where, when a trigger print job is transmitted, the user does not wish to start printing a print job of another user.

If "make job of not the same user wait" and "make job of the same transmission source wait" are checked (in step S1215; YES, in step S1218), then in step S1219, the CPU 201 sets a print job of not the same user and the same transmission source as a waiting target. This setting can be used in a case where in an environment where print jobs of a plurality of users are transmitted from a particular transmission source, the user wishes to guarantee the printing order of the plurality of users.

If "make job of not the same user wait" and "make job of different transmission source wait" are checked (in steps S1215 and S1221), then in step S1222, the CPU 201 sets a print job of not the same user and a different transmission source as a waiting target. This setting can be used in a case where the user wishes to give priority to a print job of the same user and the same transmission source.

[Waiting Print Job Output Process]

Figure 5:
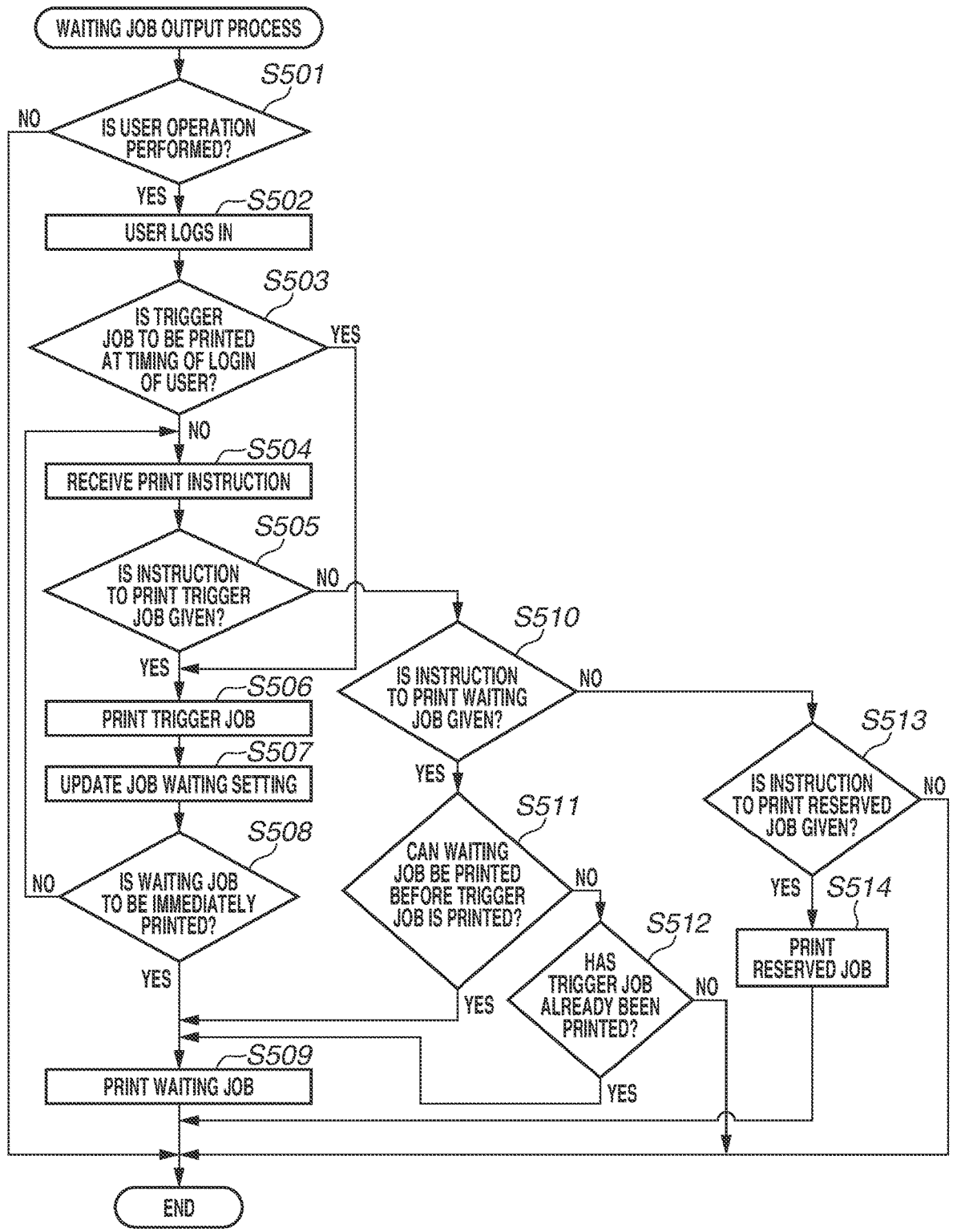
FIG. 5 is a flowchart of a waiting job output process.

A waiting print job output process performed in step S1315 is to be described. FIG. 5 illustrates a flowchart of the waiting print job output process. In step S501, the CPU 201 determines whether a user operation is performed. In a case where the user is going to use the printing apparatus 102 (YES in step S501), the user is required to log into the printing apparatus 102. Accordingly, in step S502, first, the CPU 201 receives the login of the user. In a case where the user is not going to use the printing apparatus 102 (NO in step S501), the processing ends. When the user logs in, then in step S503, the CPU 201 confirms an output setting of the waiting print job. If a setting is made so that at the time when a user logs in, a trigger print job of the logged-in user is printed (YES in step S503), then in step S506, the CPU 201 causes, via the printer I/F 209, the printer engine 210 to execute a printing process for printing the trigger print job. If a setting is made so that at the time when a user logs in, a trigger print job of the logged-in user is not printed (NO in step S503), then in step S504, the CPU 201 waits for a print instruction. Upon receiving a print instruction, in step S505, the CPU 201 determines whether a print job for which the print instruction is given is a trigger print job. If the print job for which the print instruction is given is specified as a target of a trigger print job (YES in step S505), then in step S506, the CPU 201 causes, via the printer I/F 209, the printer engine 210 to execute a printing process for printing the trigger print job. Then, in step S507, the CPU 201 updates the print job waiting setting so that a subsequent print job specified as a waiting print job is reserved. If a setting is made so that a waiting print job is immediately printed (YES in step S508), then in step S509, the CPU 201 causes, via the printer I/F 209, the printer engine 210 to execute a printing process for printing the waiting print job. If a setting is made so that a waiting print job is not immediately printed (NO in step S508), then in step S504, the CPU 201 waits for the input of a print instruction.

If the print job for which the print instruction is given is not specified as a target of a trigger print job (NO in step S505), then in step S510, the CPU 201 determines whether the print job for which the print instruction is given is a waiting target print job. If the print job is a waiting target print job (YES in step S510), the CPU 201 determines whether a setting is made so that a waiting print job can be printed before a trigger print job is printed. If a setting is made so that a waiting print job can be printed before a trigger print job is printed (YES in step S511), then in step S509, the CPU 201 performs a printing process for printing the waiting print job. If a setting is made so that a waiting print job cannot be printed before a trigger print job is printed (NO in step S511), then in step S512, the CPU 201 determines whether a trigger print job has already been printed. If a trigger print job has already been printed (YES in step S512), then in step S509, the CPU 201 performs a printing process for printing the waiting print job. If a trigger print job has not yet been printed (No in step S512), the CPU 201 does not perform a printing process for printing the waiting print job, and the processing ends.

If the print job is not a waiting target print job (NO in step S510), then in step S513, the CPU 201 determines whether the print job is a reserved print job. If the print job is a reserved print job (YES in step S513), then in step S514, the CPU 201 performs a printing process for printing the reserved print job.

[Operation of Apparatus]

The operation of the printing apparatus 102 in a case where various settings are made as below will now be described. As the various settings, the reservation setting is set to the job-induced reservation mode, a print job with a message is set as a trigger print job, and a setting is made so that after a trigger print job is canceled, a waiting print job is automatically processed. As the setting of a waiting print job, either of a print job of the same user or all print jobs can be selected.

Figure 7:
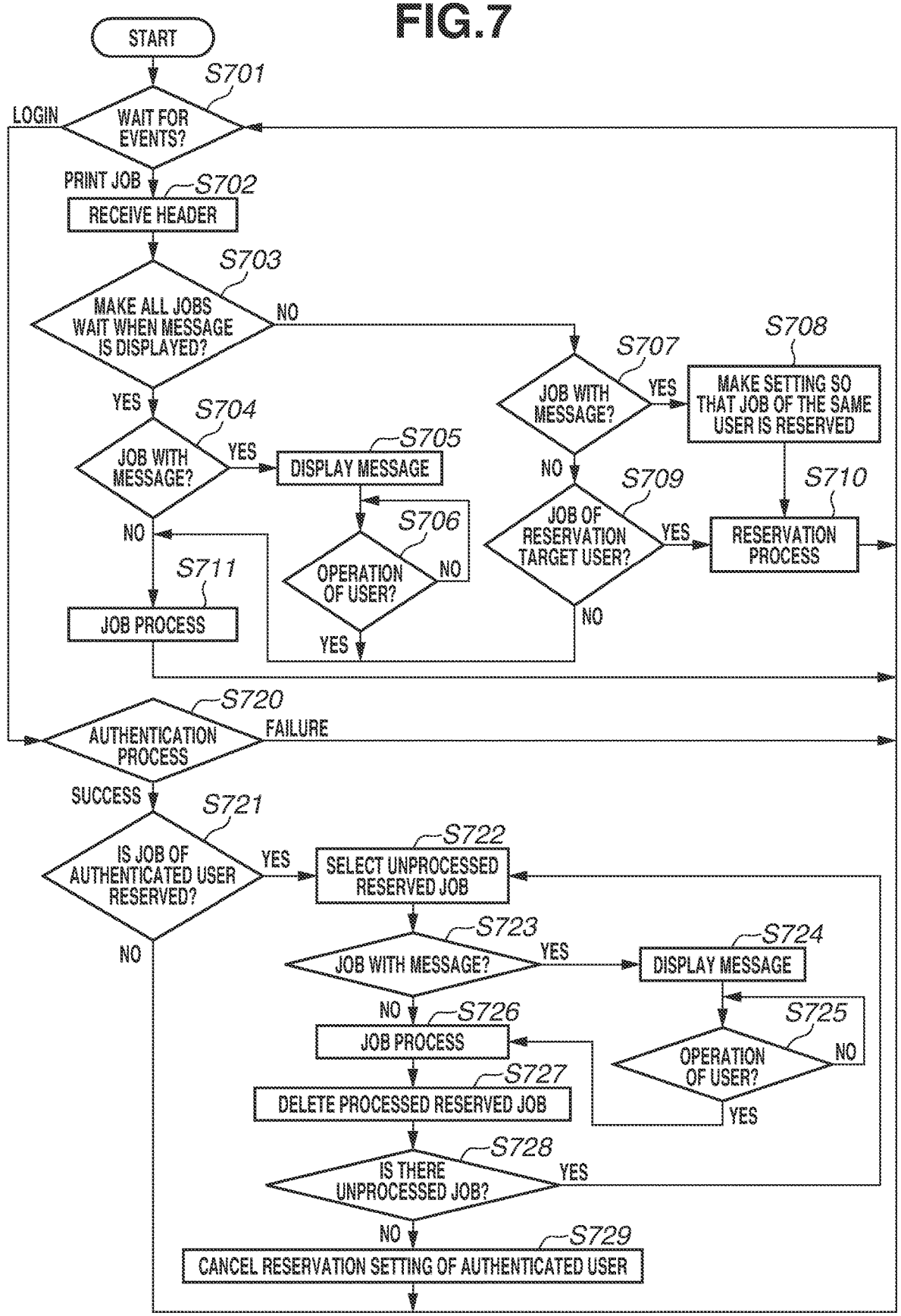
FIG. 7 is a flowchart of a print application according to an exemplary embodiment.

FIG. 7 illustrates a flowchart of the print application.

In step S701, the print application causes the print job reception unit 601 to wait to receive a print job, and causes the login unit 610 to wait for the input of authentication information. If the print job reception unit 601 receives a print job, then in step S702, the print job reception unit 601 receives at least the header portion 401 of the print job and notifies the print job analysis unit 602 of the header portion 401. The print job analysis unit 602 analyzes the header portion 401 of the received print job. In step S703, the print job analysis unit 602 notifies the determination unit 603 of the result of the analysis. Based on setting values set in advance, the determination unit 603 determines a method for processing the received print job. At this time, the determination unit 603 determines whether the setting of a target of a waiting print job is a setting for making all print jobs wait (step S1203), or a setting for making a print job of the same user wait (step S1210). If the setting of a target of a waiting print job is a setting for making all print jobs wait (YES in step S703), then in step S704, the determination unit 603 further determines whether the print job is a print job with a message.

If the print job is a print job with a message (YES in step S704), then in step S705, the job execution unit 605 causes, via the UI 205, the operation unit 212 to display the content of the message. Next, in step S706, the job execution unit 605 waits until the UI 205 detects an operation of the user. If the UI 205 detects an operation of the user (YES in step S706), then in step S711, the job execution unit 605 cooperates with the print processing unit 606 to start a printing process for printing the print job.

If the print job is not a print job with a message (NO in step S704), then in step S711, the determination unit 603 notifies the job execution unit 605 that a printing process for printing the print job is to be performed.

If the setting of a target of a waiting print job is a setting for making a print job of the same user wait (NO in step S703), the processing proceeds to step S707. Then, in step S707, the determination unit 603 further determines whether the print job is a print job with a message. If the print job is a print job with a message (YES in step S707), then in step S710, the determination unit 603 determines that the notified print job is not to be immediately processed. Then, the determination unit 603 notifies the spool unit 604 that the notified print job is not to be immediately processed. In step S708, the determination unit 603 adds the user ID of the received print job to a reservation user ID list. The "reservation user ID list" refers to setting information for reserving all print jobs having a set user ID. The reservation user ID list enables the setting of a plurality of user IDs and is saved in the ROM 202 or the RAM 203. Then, the spool unit 604 performs a saving process for saving the print job.

If the print job is not a print job with a message (No in step S707), then in step S709, the determination unit 603 determines whether the print job is a print job of a reservation target user. In other words, the determination unit 603 determines whether the user ID included in the print job is included in the reservation user ID list. If the user ID of the print job is included in the reservation user ID list (YES in step S709), the determination unit 603 determines that the print job is not to be immediately processed. Then, the determination unit 603 notifies the spool unit 604 that the print job is not to be immediately processed. Then, in step S710, the spool unit 604 performs a reservation process for reserving the print job. If the user ID of the print job is not included in the reservation user ID list (NO in step S709), the determination unit 603 determines that the print job is to be immediately processed. Then, the determination unit 603 notifies the job execution unit 605 that the print job is to be immediately processed. In step S711, the job execution unit 605 cooperates with the print processing unit 606 to start a printing process for printing the print job.

If authentication information is input in step S701, then in step S720, the login unit 610 starts an authentication process. Upon starting the authentication process, the login unit 610 communicates with the authentication server 104. If the authentication fails as a result of the communication with the authentication server 104, the login unit 610 displays an error message, and the processing proceeds to step S701.

If the authentication is successful, the login unit 610 notifies the print job management unit 611 that the authentication is successful. In step S721, the print job management unit 611 causes the spool unit 604 to search for a print job having the user ID same as a user ID obtained by the authentication process in step S720 (a print job of the authenticated user). If a print job of the authenticated user is not reserved (NO in step S721), the processing returns to step S701. If print jobs of the authenticated user are reserved (YES in step S721), then in step S722, the print job management unit 611 notifies the job execution unit 605 of a print job of which the date and time of reception is the oldest (the reception timing is the earliest) from among the found print jobs. In step S723, the job execution unit 605 determines whether a message is included in the notified print job. If a message is included (YES in step S723), then in step S724, the job execution unit 605 causes, via the UI 205, the operation unit 212 to display the message. Next, in step S725, the job execution unit 605 waits until the UI 205 acquires the input of an operation of the user. Upon detecting an operation of the user (YES in step S725), then in step S726, the job execution unit 605 cooperates with the print processing unit 606 to start a printing process for printing the notified print job. When the process of the job execution unit 605 is completed, the print job management unit 611 notifies the spool unit 604 that the processed print job is to be deleted. The spool unit 604 deletes the notified print job from the HDD 204. Next, in step S728, the print job management unit 611 causes the spool unit 604 to search again for a print job having the user ID same as the user ID obtained by the authentication process in step S720. If there is an unprocessed print job (YES in step S728), the processing returns to step S722, and the above processing is repeated. If the processes of all the print jobs are completed (NO in step S728), the print job management unit 611 notifies the determination unit 603 of the user ID obtained by the authentication process in step S720. In step S729, the determination unit 603 deletes the notified user ID from the reservation user ID list.

[Verification of Effects]

The effects of the image forming system according to the present exemplary embodiment are verified. In the verification of the effects, a case is assumed where the PC 103 transmits a plurality of print jobs to the printing apparatus 102. FIG. 8A illustrates the situation where the PC 103 transmits print jobs to the printing apparatus 102. Specifically, a user 01, who has logged in to the PC 103, transmits jobs 01, 02, and 03 to the printing apparatus 102 in order at 00:08:00. A user 02, who has logged into the document server 101, transmits a job 04 to the printing apparatus 102 at 00:08:10. In the verification, a case is assumed where a message is assigned to the job 01.

Conventional Example

FIG. 8B is a diagram illustrating a conventional example. In the conventional example, if the job 01, to which a message is assigned, is received as illustrated in FIG. 8B, the job 01 is reserved, the message is displayed, and all the subsequent print jobs are caused to wait. Then, if the job 01 is processed according to an instruction from the user, a printing process for printing the subsequent print jobs having waited is executed. Such processing is performed, whereby the user 01 can prepare printing conditions and then start a printing process for printing the job 01. In the conventional example, however, since all the print jobs received after the job 01 (the jobs 02, 03, and 04) are caused to wait, even a print job of the user 02 (the job 04) is caused to wait. Thus, this situation is inconvenient for the user 02.

Comparative Example

FIG. 8C is a diagram illustrating a comparative example. In the comparative example, only a print job to which a message is assigned is reserved so that other print jobs can be immediately printed. For this reason, the user can prepare printing conditions and then provide an instruction to perform a printing process for printing the job 01. It is possible to immediately print the jobs 02, 03, and 04 without making the jobs 02, 03, and 04 wait. That is, unlike the conventional example, the user 02 is not caused to wait. In this example, however, the print jobs are processed in order different from the order of print job transmission by the user 01. As a result, an issue can arise in a case where the user 01 wishes to print the print jobs in the order of print job transmission. The case where the user 01 wishes to print the print jobs in the order of print job transmission corresponds to, for example, a case where the jobs 01, 02, and 03 are print jobs related to each other. In an image forming apparatus such as the printing apparatus 102, image quality is considerably varied due to a change in the use environment. In particular, in a case where the message of the job 01 describes an instruction to calibrate the printing apparatus 102, the jobs 02 and 03 are output with image quality before the calibration, and the job 01 is output with image quality after the calibration. In a case where the message of the job 01 describes an instruction to change plain paper to special paper, the jobs 02 and 03 are output with plain paper, and the job 01 is output with special paper. For this reason, if there are print jobs related to each other, it is desirable to consecutively print the related print jobs to avoid these issues.

VERIFICATION EXAMPLES

In the present exemplary embodiment, in view of the above, a setting is made so that when a print job with a message is received, a print job of the same user is automatically reserved as a print job related to the print job with a message. The operation of the printing apparatus 102 according to the present exemplary embodiment is described using verification examples 1 and 2.

Verification Example 1

The processing performed by the image forming system according to the exemplary embodiment is verified by assuming specific situations. In verification example 1, a case where the user 01 does not log into the printing apparatus 102 until the job 04 is received is verified. FIG. 8D is a diagram illustrating verification example 1.

If the document server 101 transmits print jobs in the order of the jobs 01, 02, 03, and 04, the printing apparatus 102 first receives the job 01. At this time, since the job 01 is a print job with a message, the CPU 201 performs a reservation process for reserving the job 01 (step S710). The CPU 201 makes a setting for reserving a print job including the same user ID as that of the job 01 (step S708). Since the subsequently received jobs 02 and 03 include the same user ID as that of the job 01 (YES in step S709), the CPU 201 performs a reservation process for reserving the jobs 02 and 03 (step S710). Since the job 04 includes a different user ID from that of the job 01 (NO in step S709), the CPU 201 immediately performs a printing process for printing the job 04 (step S711). Then, if the user 01 logs in (step S721), the CPU 201 automatically selects a print job in the chronological order of the dates and times of reception (step S722). Since the job 01 is a print job with a message (YES in step S723), the CPU 201 causes the operation unit 212 to display the message (step S724). Then, the CPU 201 waits until an operation of the user (a print instruction) is performed, and according to a print instruction, the CPU 201 performs a printing process for printing the job 01 (step S726). Then, the CPU 201 automatically selects the jobs 02 and 03, to which a message is not assigned, and performs a printing process for printing the jobs 02 and 03 in order.

As described above, according to the present exemplary embodiment, if a print job of a user different from a user of a print job with a message is received, printing of the received print job without reserving the received print job can be performed. As a result, the user 02 does not need to wait due to a print job of the user 01. This leads to excellent usability.

Verification Example 2

In verification example 2, a case where the user 01 logs in before the job 04 is received is verified. FIG. 8E is a diagram illustrating verification example 2.

If the document server 101 transmits print jobs in the order of the jobs 01, 02, 03, and 04, the printing apparatus 102 first receives the job 01. At this time, since the job 01 is a print job with a message, the CPU 201 performs a reservation process for reserving the job 01 (step S710). The CPU 201 makes a setting for reserving a print job including the same user ID as that of the job 01 (step S708). Since the subsequently received jobs 02 and 03 includes the same user ID as that of the job 01 (YES in step S709), the CPU 201 performs a reservation process for reserving the jobs 02 and 03 (step S710). Then, if the user 01 logs in before the job 04 is received (step S721), the CPU 201 selects a print job in the chronological order of the dates and times of reception (step S722). Since the job 01 is a print job with a message (YES in step S723), the CPU 201 causes the operation unit 212 to display the message (step S724). Then, the CPU 201 waits until an operation of the user (a print instruction) is performed, and according to a print instruction, the CPU 201 performs a printing process for printing the job 01 (step S726). Then, the CPU 201 performs a printing process for printing the jobs 02 and 03, to which a message is not assigned, in order. Upon receiving the job 04, the CPU 201 immediately performs a printing process for printing the job 04 (step S711).

As described above, in the present exemplary embodiment, separately processing print jobs of a user that transmitted a print job with a message and a print job of another user can be achieved. Thus, the printing order of the print jobs of the user that transmitted the print job with a message can be guaranteed, regardless of the reception timing of the print job of the other user.

As described above, upon receiving a print job, the printing apparatus 102 according to the present exemplary embodiment determines whether the print job is to be immediately executed. If the print job is a print job with a message, the printing apparatus 102 does not immediately print the print job, and performs control so that when a print job having the same user ID as that of the print job is received, a printing process for printing the print job having the same user ID is not to be immediately executed. As a result, it is possible to immediately print a print job that has a user ID different from that of the print job with a message and to which a message is not assigned.

In the present exemplary embodiment, when print jobs not to be immediately printed are saved in the HDD, the print jobs are saved so that the order of reception of the print jobs can be determined. For this reason, a printing process can be executed in the same order same as the order of reception. In the present exemplary embodiment, when the user logs in, a print job of the user is automatically selected in chronological order. For this reason, the user need only perform a login process, which is convenient. A first reserved print job of a plurality of reserved print jobs is a print job with a message. Accordingly, the user can easily confirm the message of the print job when logging in to the printing apparatus 102.

[Secure Print Job (Variation)]

In the above description, a print job with a message is set as a target of a trigger print job. Alternatively, a secure print job can be set as a trigger print job. A "secure print job" refers to a print job for which a so-called secure print function is specified. A secure print job is generated by the driver of the PC 103. If an instruction to generate a print job is provided by specifying secure print, the driver assigns, to the header portion 401 of the print job, information indicating that the print job is a secure print job. A printing process for printing a secure print job is not started until the user performs an authentication process on the printing apparatus 102. Therefore, a secure print job is similar to a print job with a message in that the user needs to operate the printing apparatus 102 in order to perform a printing process for printing the print job. A secure print job, however, is different from a print job with a message in that a message is not displayed. A secure print job is different from a print job with a message in that a password can be set. A printing process for printing the print job to which a password is assigned can be performed if a password input to the printing apparatus 102 matches the password assigned to the print job.

Both a print job with a message and a secure print job can be specified as targets of trigger print jobs.

[Transmission Source Information (Variation)]

In the above description, a print job including the same user information as that of the trigger print job is set as a target of a waiting print job that is a print job related to a trigger print job. Alternatively, a print job including the same transmission source information as that of the trigger print job can be set as a waiting print job. In a case where transmission source information is used, upon receiving a print job, the printing apparatus 102 acquires transmission source information about the print job and saves the transmission source information in association with the print job. The transmission source information is, for example, the Internet Protocol (IP) address of the document server 101 and the IP address of the PC 103. The IP address of the document server 101 is "XXX.XXX.XXX.100", for example. The IP address of the PC 103 is "XXX.XXX.XXX.200", for example.

Alternatively, a print job including the same user information and the same transmission source information can be specified as a target of a waiting print job. This can further enhance the relevance between a trigger print job and a waiting print job.

[Print Instruction Screen (Variation)]

In the above description, based on the cancellation of a trigger print job, a waiting print job is automatically selected, and the printing of the waiting print job is started. A method for processing a waiting print job, however, is not limited to this example. For example, the printing of a waiting print job can be started based on a selection instruction from the user. Print instruction screens 1 and 2 are described below as examples of a print instruction screen.

[Print Instruction Screen 1]

First, the print instruction screen 1 is described. FIG. 10A is a diagram illustrating a first step of the instruction screen. FIG. 10B is a diagram illustrating a second step of the instruction screen. FIG. 10C is a diagram illustrating a third step of the instruction screen.

If the user logs into the printing apparatus 102 and selects a print function, the print instruction screen is displayed on the operation unit 212. Various objects are arranged on the print instruction screen according to the present exemplary embodiment.

A print job list 1000 is an object for displaying a list of pieces of information about print jobs associated with the logged-in user. The print job list 1000 indicates, as information, the file name of a print job, the date and time of reception of the print job, and a message included in the print job. If the titles of information items in the print job list 1000 are selected, the print job management unit 611 rearranges the print job list 1000 based on the file names and the dates. Job list selection buttons 1001 are objects for specifying the processing order of print jobs. An order specifying button is present for each print job in the list. If these buttons are pressed, the print job management unit 611 assigns numbers to the print jobs in the order of the pressing and displays the assigned numbers as illustrated in FIG. 10B. The numbers assigned as described above indicate the order of printing. Alternatively, the order of print jobs can be determined by selecting a "select all" button 1005. In a case where the "select all" button 1005 is used, numbers are assigned from top to bottom in the order of arrangement in the print job list 1000. An execution button 1003 is a selection object for starting a printing process for printing the print jobs selected as described above. Unselected print jobs are obviously not printed. A logout button 1004 is a selection object for the user to log out of the printing apparatus 102.

In the present exemplary embodiment, display print job lists can separately be displayed based on the transmission sources of print jobs. A drop-down list 1002 is an object for selecting print jobs to be displayed on the print instruction screen. On this instruction screen, print jobs of which the transmission sources have an IP address selected using the drop-down list 1002 are displayed in the print job list 1000. If another IP address is selected using the drop-down list 1002, then as illustrated in FIG. 10C, the content of the print job list 1000 is changed. In this case, a print job list is displayed with respect to each transmission source. Alternatively, a display method for not separating print job lists based on the transmission sources can be used.

[Print Instruction Screen 2]

Next, the print instruction screen 2 is described. FIG. 11A is a diagram illustrating a first step of the print instruction screen. FIG. 11B is a diagram illustrating a second step of the print instruction screen.

The print instruction screen in FIGS. 11A and 11B is different from the print instruction screen in FIGS. 10A to 10B in that a drop-down list for specifying the IP address of a transmission source is omitted, and an area 1100 for displaying the IP address of a transmission source is added to the print job list 1000. If the pressing of a button for specifying the order of print jobs in FIGS. 11A and 11B is detected, the print job management unit 611 causes the spool unit 604 to search for print jobs related to a print job ID associated with the pressed button. Then, the print job management unit 611 displays a dialog 1101 for confirming whether to select found print jobs. If the print job management unit 611 detects the pressing of a "select" button, the print job management unit 611 determines the printing order of the related print jobs as the order of reception. As described above, if a trigger print job and a print job related to the trigger print job are stored in association with each other, easily specifying the associated print job can be achieved.

According to the present disclosure, it an image processing apparatus can delay printing a received print job based on the reception of a print job of the same user as that of a reserved print job while starting to print the received print job based on the reception of a print job of a user different from that of the reserved print job.

The functions of the above exemplary embodiment can also be achieved by supplying software (a program) to a system or an apparatus via a network or various recording media, and causing a computer (or a central processing unit (CPU) or a microprocessor unit (MPU)) of the system or the apparatus to read and execute the program. As the various storage media, a single storage medium or a plurality of storage media can be used. As the computer (or the CPU, the MPU, or an application-specific integrated circuit (ASIC)) of the apparatus can be a single computer or a plurality of computers.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183794, filed Sep. 21, 2016, which is hereby incorporated by reference herein in its entirety.

What is claimed is:

1. A printing apparatus holding print data if the print data transmitted from an external apparatus satisfies a pre-defined condition and printing out the held print data in accordance with a print instruction given by a user, comprising:
   a communication interface configured to receive the print data transmitted from the external apparatus
   one or more memories; and
   one or more processors that execute a set of instructions to:

store the print data received via the communication interface and satisfying a pre-defined condition into the one or more memories as a hold target print data;

store first subsequent print data received via the communication interface into the one or more memories as the hold target print data, the first subsequent print data not satisfying the pre-defined condition and associated user information that is identical to user information associated with the print data stored in the one or more memories; and perform control to initiate printing without waiting for a print instruction given by the user for second subsequent print data received via the communication interface, the second subsequent print data not satisfying the pre-defined condition and not associated with the user information that is identical to the user information associated with the print data stored in the one or more memories.

2. The printing apparatus according to claim 1, further comprising a display, wherein the print data satisfying the pre-defined condition includes message information to be displayed on the display.

3. The printing apparatus according to claim 1, wherein the print data satisfying the pre-defined condition is print data requiring input of authentication information to initiate printing.

4. The printing apparatus according to claim 1, further comprising a console, wherein the one or more processors execute the instructions to perform control to execute printing based on selected print data in accordance with a print instruction received from the user via the console.

5. The printing apparatus according to claim 1, wherein the one or more processors execute the instructions to initiate printing based on the first subsequent print data stored in the one or more memories upon printing the print data stored in the one or more memories.

6. The printing apparatus according to claim 1, wherein a header portion of the print data includes the user information.

7. The printing apparatus according to claim 1, wherein the user information is a user identification (ID).

8. The printing apparatus according to claim 1, wherein the print data satisfying the pre-defined condition is print data with stored setting information attached.

9. A control method for controlling a printing apparatus holding print data if the print data transmitted from an external apparatus satisfies a pre-defined condition and printing out the held data in accordance with a print instruction given by a user, the control method comprising:

receiving the print data transmitted from the external apparatus;

storing print data received and satisfying a pre-defined condition into one or more memories of the printing apparatus as hold target print data;

storing first subsequent print data received via a communication interface of the printing apparatus into the one or more memories as the hold target print data, the first subsequnt print data not satisfying the pre-defined condition and associated with user information that is identical to user information associated with the print data stored in the one or more memories; and perform control to initiate printing without waiting for a print instruction given by the user for second subsequent print data received via the communication interface, the second subsequent print data not satisfying the pre-defined condition and not associated with the user information that is identical to the user information associated with the print data stored in the one or more memories.

10. A non-transitory computer readable storage medium storing instructions for causing a printing apparatus holding print data if the print data transmitted from an external apparatus satisfies a pre-defined condition and printing out the held data in accordance with a print instruction given by a user to execute a method, the method comprising:

receiving the print data transmitted from the external apparatus;

storing print data received and satisfying a pre-determined condition into one or more memories of the printing apparatus as hold target print data;

storing first subsequent print data received via a communication interface of the printing apparatus into the one or more memories as the hold target print data, the first subsequent print data not satisfying the pre-defined condition and associated with user information that is identical to user information associated with the print data stored in the one or more memories; and perform control to initiate printing without waiting for a print instruction given by the user for second subsequent print data received via the communication interface, the second subsequent print data not satisfying the pre-defined condition and not associated with the user information that is identical to the user information associated with the print data stored in the one or more memories.

* * * * *